United States Patent [19]
Beckwith

[11] Patent Number: 5,384,667
[45] Date of Patent: Jan. 24, 1995

[54] VIDEO PROCESSING SYSTEM

[75] Inventor: Timothy Beckwith, Reading, England

[73] Assignee: Quantel Limited, Newbury, England

[21] Appl. No.: 70,507

[22] Filed: Jun. 1, 1993

Related U.S. Application Data

[63] Continuation of Ser. No. 518,793, May 4, 1990, abandoned.

[30] Foreign Application Priority Data

May 5, 1989 [GB] United Kingdom ................ 8910380

[51] Int. Cl.⁶ ..................... H04N 5/78; G11B 27/02; G06F 15/00
[52] U.S. Cl. .................... 360/33.1; 360/14.1; 358/351; 395/152
[58] Field of Search ................. 360/14.1, 14.2, 14.3; 358/22, 311, 80, 351, 346; 352/87; 340/750, 725; 364/192, 193, 191, 578, 521; 395/152, 154, 155; 345/189, 190, 200

[56] References Cited

U.S. PATENT DOCUMENTS

| | | | |
|---|---|---|---|
| 4,258,385 | 3/1981 | Greenberg et al. | 358/22 |
| 4,339,775 | 7/1982 | Lemke et al. | 360/10.3 |
| 4,446,520 | 5/1984 | Shigeta et al. | 364/192 |
| 4,688,106 | 8/1987 | Kellar et al. | 358/342 |
| 4,752,836 | 6/1988 | Blanton et al. | 358/342 |
| 4,757,384 | 7/1988 | Nonweiler et al. | 358/160 |
| 4,811,241 | 3/1989 | Liang | 364/518 |
| 4,870,509 | 9/1989 | Nagasawa et al. | 360/86.1 |
| 4,897,806 | 1/1990 | Cook et al. | 395/152 |
| 4,974,178 | 11/1990 | Izeki et al. | 364/518 |
| 5,025,394 | 6/1991 | Parke | 395/152 |

FOREIGN PATENT DOCUMENTS 2047041 3/1980 United Kingdom ......... H04N 5/76
2096868 10/1982 United Kingdom .

OTHER PUBLICATIONS

Harry E-Motion II pamphlet (2 pages), Sep. 1988.
The Quantel DLS 6001 pamphlet, pp. 8 and 9, date unknown.
BBC Research Department report 1988/4, May 1988, pp. 4–17.
Pamphlet entitled "Harry E-Motion II", 2 pages, dated Sep. 1988.

Primary Examiner—Aristotelis Psilos
Assistant Examiner—Varsha Kapadia
Attorney, Agent, or Firm—Cooper & Dunham

[57] ABSTRACT

A video processing system comprises a processing unit, a VDU, and a look-up table. A user defined profile is displayable on the VDU and can be adjusted interactively by way of a stylus and touch tablet. Data representing the profile is stored in the look-up table. An input video clip is stored in digital form in a disc store and output video clip frames are generated in accordance with the user defined profile data. The system can be used for example to stretch or compress a video clip in time.

33 Claims, 3 Drawing Sheets

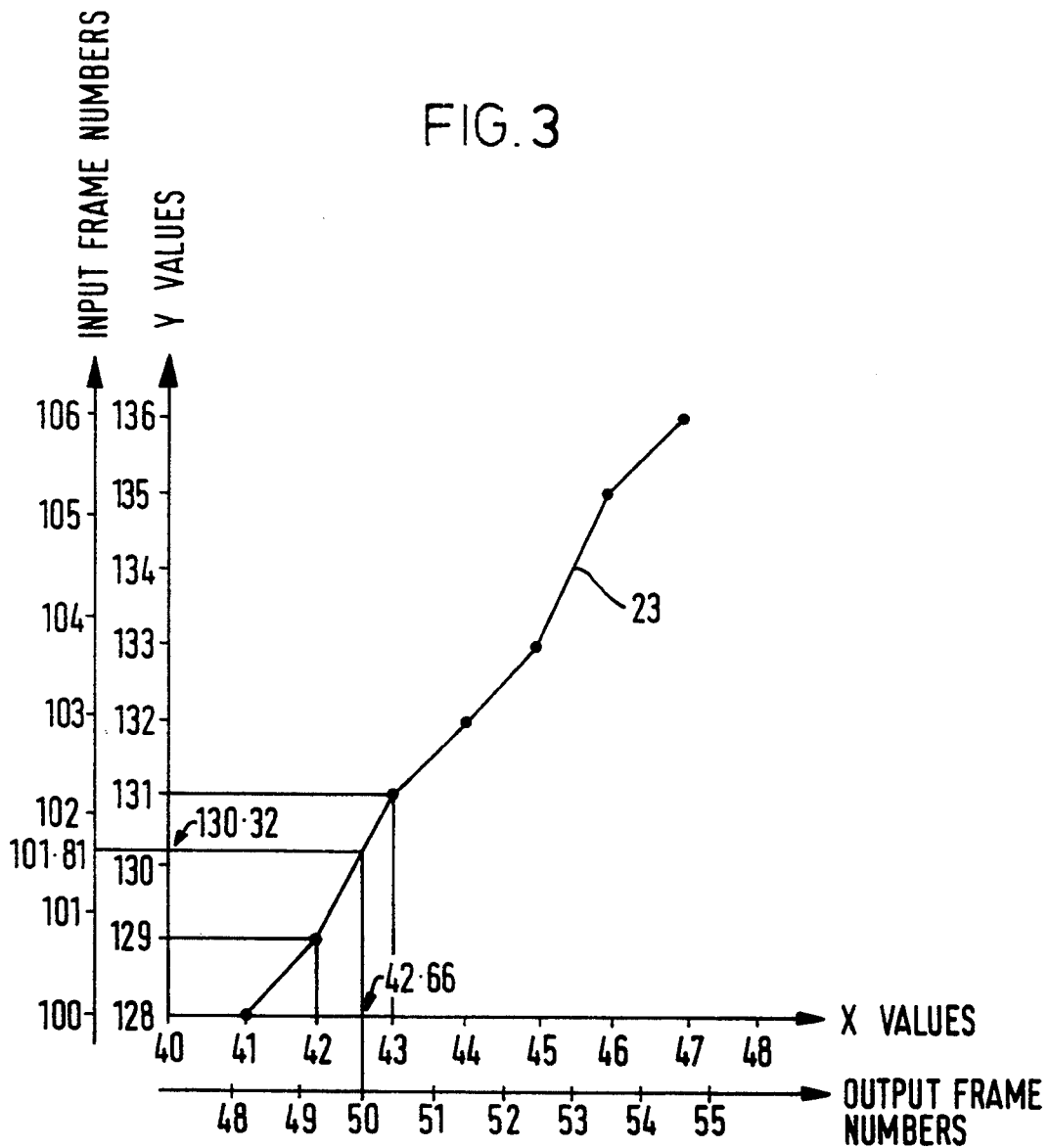

VIDEO PROCESSING SYSTEM

This is a continuation of application Ser. No. 07/518,793 filed May 4, 1990 now abandoned.

FIELD OF THE INVENTION

The invention relates to a video processing system and in particular relates to a system in which an input sequence of video frames is processed to produce an output sequence.

BACKGROUND OF THE INVENTION

Editing techniques are known in which the normal sequence of video frames from a video clip is altered to produce a re-timed sequence. For example a clip having a duration of only a few seconds may be repeated or individual frames of a clip may be removed to reduce slightly the duration of the clip. These techniques are often employed to synchronise video to an audio soundtrack and in more sophisticated applications for example to synchronise the movements of a mouth (possibly that of an animal) to a recorded soundtrack, of say, speech. The legs of an animal may also be synchronised in this way so that a single leg movement may be repeated many times to create, say, the illusion of a cow 'dancing' in time to recorded music.

A machine which has made these effects, and many more, available to commercial video producers is manufactured by the present Applicant and sold under the trademark "HARRY". In this machine, frames of video are digitally encoded and stored on magnetic discs, as disclosed in U.S. Pat. No. 4,688,106 assigned to the present applicant. A problem with known techniques for stretching video clips is that each stretching (or compressing) process has been limited to very simple functions, such as stretch by 20%, or remove 3 frames etc. Thus, a complicated movement lasting only a few seconds may have to be built up from many small clips having different functions applied thereto.

OBJECTS AND STATEMENTS OF THE INVENTION

The invention aims to provide an improved system for stretching and compressing video clips.

According to the present invention, there is provided a video processing system, comprising a video storage device for storing an input sequence of video frames; defining means for defining an output sequence of video frames in relation to said input sequence frames; and generating means for generating an output sequence of video frames from said input video frames in accordance with the defined relationship.

The above and further features of the invention are set forth with particularity in the appended claims and together with advantages thereof will become clearer from consideration of the following detailed description of an exemplary embodiment of the invention given with reference to the accompanying drawings.

BRIEF DESCRIPTION OF THE DRAWINGS

FIG. 3 shows an enlarged portion of a profile shown in FIG. 2.

DETAILED DESCRIPTION OF AN EMBODIMENT OF THE INVENTION

Figure 1:
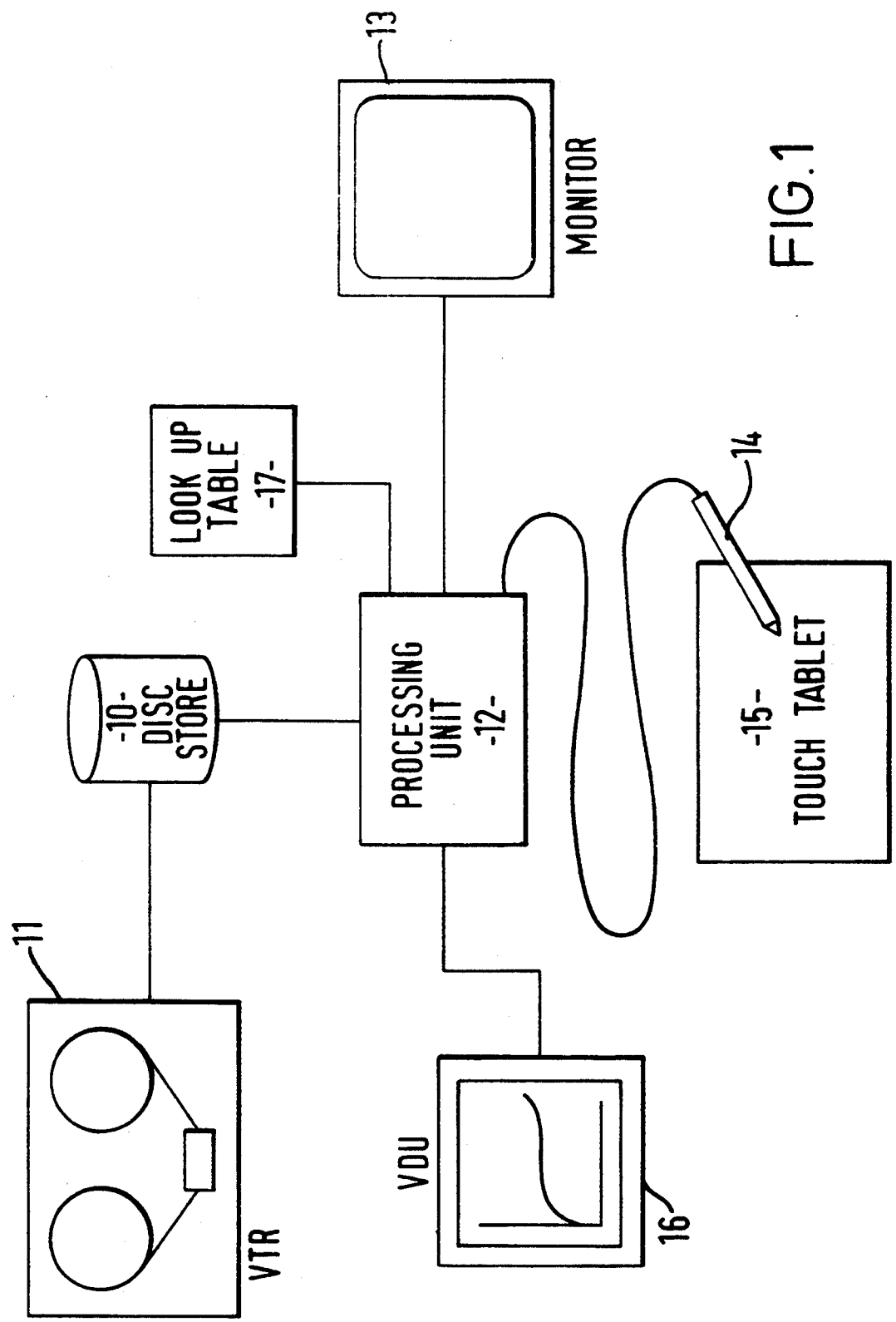
FIG. 1 shows a video processing system including a graphical device for displaying functional profiles.

A video processing system is shown in FIG. 1 in which an input sequence of video frames, referred to herein as an input clip, is supplied to a parallel magnetic disc store 10 from a video tape recorder VTR 11. The video data is stored on disc as digitally encoded pixels, each having components representing luminance and two colour difference values. A system for storing video data on magnetic disc, allowing data transfer at video rate, is disclosed in U.S. Pat. No. 4,688,016 assigned to the present Applicant. Alternatively, the data may be stored in a solid-state memory device. Preferably, the video data is in the abovementioned component form but a D2 composite machine, or an analogue machine, may instead be used together with a suitable converting device for converting the data into component form.

Data from the disc store 10 is read by a processing unit 12. The processing unit 12 is arranged to convert the video data from its component form into analogue signals which are applied to a monitor 13 for display of the video image on the monitor 13. The monitor 13 is arranged also to display symbols representing user selectable control functions in the form of a menu of options from which a function can be selected. A stylus 14 and a touch tablet 15 are provided in order to facilitate control of the system. Positioning and movement of the stylus 14 on the touch tablet 15 causes the touch tablet 15 to generate signals representative of the position of the stylus 14 and these signals are interpreted by the processing unit 12 to cause a cursor (not shown) to be displayed at a corresponding position on the monitor 13. The stylus 13 is pressure sensitive and values representing the pressure applied by the stylus to the touch tablet 14 are also delivered to the processing unit 12. In order to select an option from the menu, the cursor is moved over the representation in the menu of the desired option by way of movement of the stylus on the touch tablet and the pressure applied by the stylus is increased by pressing down hard. The processing unit 12 responds to this by reconfiguring the system to perform the selected function.

A function which can be selected, from the menu displayed on the monitor 13, is "profile stretch" in which an input video clip is-stretched, compressed or reversed in response to a profile defined by the user of the system. When "profile stretch" is selected the processing unit 13 causes a visual display unit. VDU 16 to display a profile graph defined by mutually perpendicular x and y axes, in which the vertical y axis represents the frames of a stored input video clip and the horizontal x axis represents the frames of a video clip to be generated and output for display.

Figure 2:
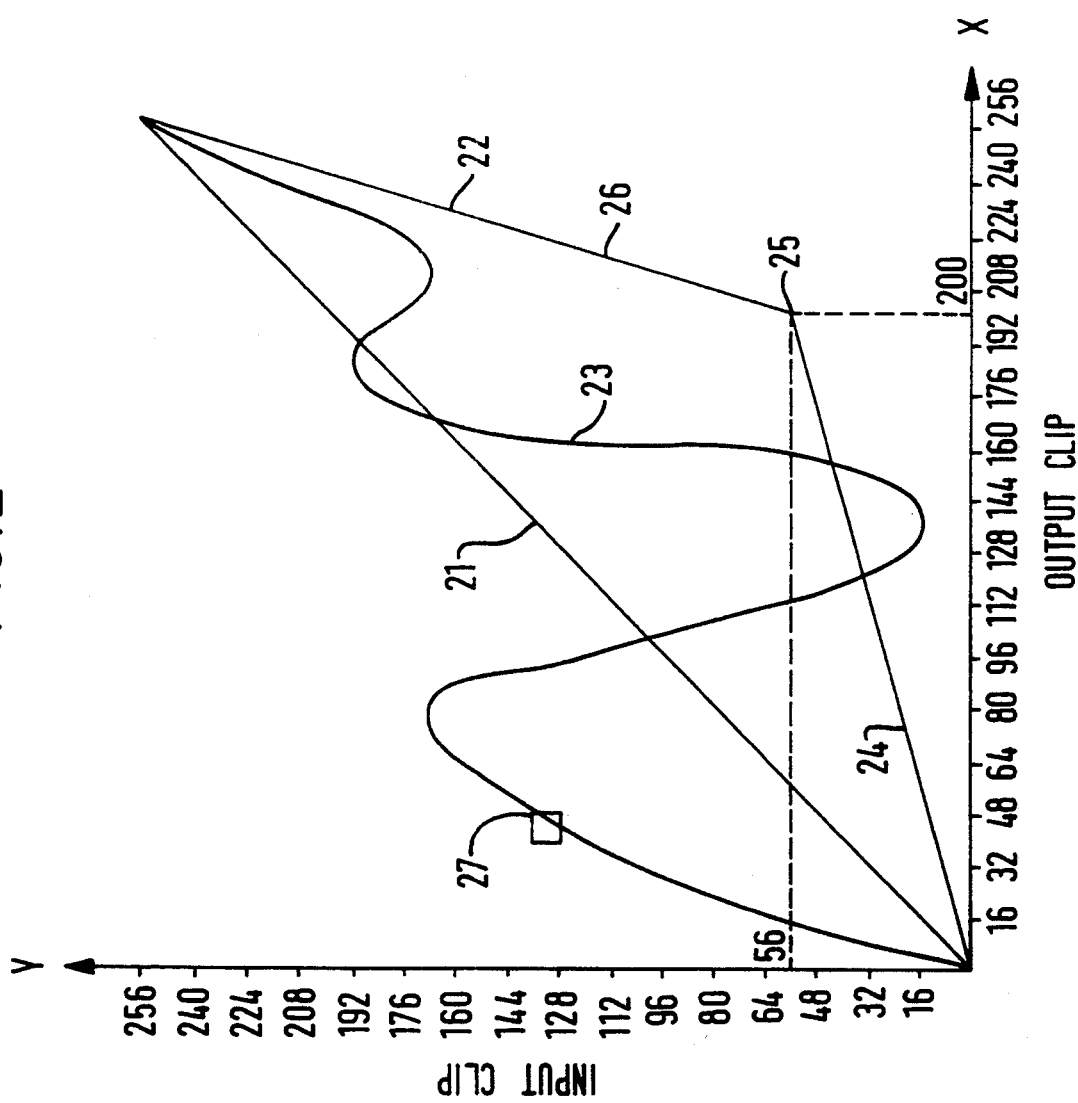
FIG. 2 shows examples of graphical profiles of the type displayed on the device shown in FIG. 1.

The profile graph displayed on the VDU 16 is shown in detail in FIG. 2 of the accompanying drawings. FIG. 2 also shows three exemplary user defined profiles 21, 22 and 23. A profile defining the relationship between input video frames and output video frames can be defined by the user by way of operation of the stylus 14 upon the touch tablet 15, with movement of the stylus being interpreted by the processor 12 as corresponding changes in the profile. The definition of the profile graph on the VDU 16 is preferably 256×256 points and therefore a profile will consist of lines connecting points on a 256×256 grid. Other grid definitions may be used but the 256 grid is suitable for most applications. As a profile line is drawn the position of the stylus along the y axis is stored for each of the 256 positions along the x axis—the y scale also being divided into 256 positions.

Of the three profiles shown in FIG. 2, the profile 21 (y=x) produces no effect because the number of each output video clip frame corresponds to the number of each input video clip frame. The profile 21 is therefore an identify function.

The profile 22 comprises a first portion 23 and a second portion 24 connected at a knee point 25. The first portion 23 causes a first portion of an input video clip comprising a number of frames to be stretched over a larger number of output frames, so that on playback the first portion frames of the clip are displayed on the monitor at a slower rate. After the knee point 25, the remaining frames of the input video clip are compressed in time for display in the remainder of the output clip. The remaining frames are therefore seen at increased speed.

The profile 23 first causes a portion of the clip to be output at a faster rate, it then causes the output clip to be the reverse of the input clip for a while, it next causes a portion of the output clip to be an even faster version of a corresponding portion of the input clip, for a short period a portion of the output clip is again the reverse of a corresponding input clip portion, and finally the last few frames at the output clip are a speeded up version of the corresponding last few input clip frames. Each of the profiles 21 to 23 shown produces an output which starts at the first frame of the input clip and ends at the last frame of the input clip. However a profile does not necessarily have to conform to this constraint and a profile may be drawn anywhere within the area bounded by the axes, subject to the restriction that the input frames (y) must be defined as a continuous function of output frames (x) with only one value of y for each value of x.

An input clip may consist of any number of input video frames and similarly an output clip may be defined as any number of output video frames; the number of input frames being defined when the clip is selected and the number of output frames being selected by the operator. The scale of the profile graph is for example 256 by 256 points and the profile is stored by programming a look-up table 17. The look-up table 17 consists of a random access memory device having 256 memory locations one for each x axis value and each location being arranged to store an eight bit code representing a corresponding y axis value as defined by the profile. Memory locations are addressed by supplying an 8 bit address code corresponding to an x axis value. That is to say, an eight bit code representing a value on the x axis is applied to the address bus of the memory device to produce at the memory output an eight bit code representing a value on the y axis.

A profile is defined by use of the stylus 14 and the touch tablet 15. Points can be defined at any desired position on the graph and when a point is selected, the x value at that point is used to address a location in the look-up table 17 and the corresponding y value is stored as an eight bit code at that location. When a point is defined by the user, the profile between the defined point and the previously define point is displayed by drawing a straight line (i.e. by linear interpolation) between the two points. With all desired points in the profile selected, the profile may be smoothed between points by applying a smoothing function, for example least squared fit, to the selected points. Predefined profiles such as a sinewave portion or other commonly used functions can also be stored in memory and selected by the user when required, instead of having to define a profile each time the "profile stretch" is to be used. Once the profile has been defined, an input clip is identified from the video data in the disc store 10 using the stylus and touch tablet interactively with the monitor 13. This interactive identification consists of the user identifying the desired start frame and end frame of the input clip from the available video in the disc store 10, thereby defining the number of frames in the input clip. The number of output frames is then selected and a check is made to ensure that sufficient space exists in the disc 10 to accept these new frames as they are generated.

In the case of the three profiles 21, 22, 23 in FIG. 2, the first frame of the output clip is identical to the first frame of the input clip, because each of the profiles 21, 22, 23 starts at the origin of the profile graph. However, with the exception of the profile 22, the second frame of the output clip will not be the same as the second frame of the input clip, because the clip will be compressed or expanded at this point in time and so a new output frame must be calculated by interpolation. For each frame in the output clip there will be a corresponding value along the x axis of the profile graph. Unless there happens t be 256 frames in the output clip, i.e. the same as the number of points on the x axis, the corresponding position of each frame on the x axis must be calculated. Thus, the first stage of the interpolating process consists of identifying the position of an output frame with respect to the values of the x axis. This calculated position may be an integer or it may be a fraction. If the position is an integer then the x value for the position is used to address the corresponding value in the look-up table and the corresponding y value is thus obtained. If however, the calculated position is a fraction, for example 3.5, the two locations, i.e. addresses 3 and 4, are addressed and two y values are obtained. The corresponding y value for the fraction at x value is then obtained by interpolating between the two y values output from the look-up tablet which gives y as a fractional number between 1 and 256. For a given value on the y axis there will be a corresponding frame position in the input video clip. The corresponding input frame position is calculated from the y value to identify the frame or frames in the input clip which is or are to comprise an output frame. The calculated input frame position may be an integer in which case a single input frame forms the output frame, ir it may be a fraction in which case two input frames will contribute to the output frame. If the calculated frame position is a fraction then an interpolated output frame is derived from two stored input frames by linear interpolation of each pixel of the stored input frames using a weighting determined by the fractional component of the calculated input frame position.

The process for generating new frames by interpolation will now be described by way of example with reference to FIG. 3 of the accompanying drawings, which shows a portion 27 of the profile 23 on an enlarged scale. Also shown in FIG. 3 are axes representing output and input frame positions in relation the x and y axes respectively. In this example, a 300 frame output clip (corresponding to 10 seconds of NTSC video) is generated from a 200 frame input clip.

The profile portion 27 covers x values from 41 to 47, and corresponds to a range of output frames 48 to derived from input frames 100 to 106. For the purpose of explanation it shall now be assumed that the process has reached the stage where it will calculate output frame number 50.

The x axis is divided into 256 integer values representing 300 output frames and therefore the position x(50) of output frame number 50 on the x axis may be expressed as a fraction of the total number of output frames:

$$x(50) = 50/300 = 0.166$$

The x values are actually stored at intervals of 1/256 and therefore the x value xs(50) of output frame number 50 with respect to the look-up table address is:

$$xs(50) = 256 \times 0.166 = 42.66.$$

The address 42.66 is not a true (i.e integer) address in the look-up table and the y value for this fractional x value is obtained by interpolating between x=42 and x=43. From the look-up table, y=129 when x=42, and y=131 when x=43. Therefore, the y value for output frame 50, y(50), is given by:

$$\begin{aligned} y(50) &= 0.66 \times 131 + (1 - 0.66) \times 129 \\ &= 86.46 + 43.86 \\ &= 130.32 \end{aligned}$$

The y axis is also divided into 256 values and represents an input-clip having 200 frames. Therefore the input frame number I(50), from which output frame number 50 will be derived, is given by:

$$\begin{aligned} I(50) &= 200 \times (130.32/256) \\ &= 101.81 \end{aligned}$$

Thus, output frame number 50 is derived from input frame numbers 101 and 102 and the fractional part of I(50), i.e. 0.81, gives the weighting factor, i.e. an 81% contribution from each pixel in frame number 102 and a 19% contribution from each pixel frame number 101 on a pixel-by-pixel basis.

The output frame number 50 is thus generated by combining frames 101 and 102 of the input clip on a pixel-by-pixel basis for each luminance and colour difference signal.

Thus, each pixel P in the output frame number 50 is calculated from:

P(OUTPUT 50)=0.81P(INPUT 102)+0.19P(INPUT 101) and the new frame data thus calculated is stored in the disc store 10. The process is then repeated for output frame 51 and so on until the complete output video clip of 300 frames has been generated.

All of the output frames are stored in the disc store 10 and can be read therefrom for display on the monitor 13 for review or they can be read for storage of the output clip off-line in a bulk recording device such as VTR 11.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

I claim:

1. A video processing apparatus for producing from an input video sequence comprising a multiplicity of video images which together depict a moving scene, an output video sequence comprising a multiplicity of video images which together depict the moving scene at a different speed, with images of the output sequence having respective positions which correspond with positions in the input sequence and each image being defined by digital data representing a multiplicity of pixels which together form the scene in each image, the apparatus comprising:

a video source for providing digital data defining each image in the input sequence;

a look up table comprising a multiplicity of table locations each identified by a unique address representing a respective position in the output sequence of images, the look up table containing at each said location position data identifying a position in the input sequence of images, said position in said output sequence of images represented by said addresses having a predetermined relationship with corresponding positions in the input sequence of images represented by the position data at said addresses;

a processor operable for each image in the output sequence to identify from said position data in said look up table one or more images in the input sequence that contribute to the output image and to calculate from said position data contribution data defining the contribution made to the output image by said one or more identified input images, the processor obtaining the data for said one or more images from the video source and weighting the obtained data in accordance with the contribution data to produce digital data defining the output image.

2. A video processing apparatus as claimed in claim 1, wherein the output image data is produced from two identified input images by combining on a pixel-by-pixel basis the data representing the two input images weighted in accordance with the contribution data.

3. A video processing apparatus as claimed in claim further comprising:

a user operable input device for generating control data in response to manipulation thereof by a user; and a display device for displaying a graphical representation of a relationship between said input sequence and said output sequence, and wherein said processor is operable to effect modifications to the displayed graphical representation in response to said control data and to calculate said position data for said look up table corresponding to the relationship as represented by said modified graphical representation.

4. A video processing apparatus as claimed in claim 3, wherein said manually operable device comprises a touch tablet and stylus combination arranged to generate as said control data co-ordinate data relating to the position of the stylus on the touch tablet which data is identified by said processor as relating to input and corresponding output images.

5. A video processing apparatus as claimed in claim 3, wherein said display device is arranged to display substantially orthogonal axes representing input image numbers and output image numbers and to display a graph plotted against said axes representing said predetermined relationship.

6. A video processing apparatus as claimed in claim 2, wherein each of the images of the input and output image sequences comprises a video frame.

7. A video processing apparatus as claimed in claim 1, wherein said video source comprises a disc store for storing said input video images and for storing output video images produced by said processor.

8. A video processing apparatus as claimed in claim 1, wherein said processor is adapted to identify a start image and an end image in said input video images thereby defining an input video clip from which an output video clip is generated.

9. A video processing apparatus as claimed in claim 1 further comprising a monitor connected with said video source and said processor for displaying either of or both said input sequence of video images and said output sequence of video images.

10. A video processing apparatus as claimed in claim 9, wherein said corresponding locations in the input sequence of images are equally spaced.

11. A video processing apparatus as claimed in claim 1, wherein said locations in the output sequences of images represented by said addresses are equally spaced.

12. A video processing apparatus as claimed in claim 1, further comprising:
a user operable input device for generating control data in response to manipulation thereof by a user; and
a display device for displaying a graphical representation of a relationship between said input sequence and said output sequence, and wherein said processor is operable to effect modifications to the displayed graphical representation in response to said control data and to calculate said position data for said look up table corresponding to the relationship as represented by said modified graphical representation.

13. A video processing apparatus as claimed in claim 12, wherein said manually operable device comprises a touch tablet and stylus combination arranged to generate as said control data co-ordinate data relating to the position of the stylus on the touch tablet which data is identified by said processor as relating to input and corresponding output images.

14. A video processing apparatus as claimed in claim 12, wherein said display device is arranged to display substantially orthogonal axes representing input image numbers and output image numbers and to display a graph plotted against said axes representing said predetermined relationship.

15. A video processing apparatus as claimed in claim 1, wherein said look up table comprises a random access memory device.

16. A video processing method for producing from an input video sequence comprising a multiplicity of video images which together depict a moving scene, an output video sequence comprising a multiplicity of video images which together depict the moving scene at a different speed, with images of the output sequence having respective positions which correspond with positions in the input sequence and each image being defined by digital data representing a multiplicity of pixels which together form the scene in each image, comprising:
providing digital data from a video source defining each image in the input sequence;
utilizing a look up table having a multiplicity of look up table locations each identified by a unique address representing a respective position in the output sequence of images, each of said locations containing position data identifying a position in the input sequence of images, said position in said output sequence of images represented by said addresses having a predetermined relationship with corresponding positions in the input sequence of images represented by the position data at said addresses;
carrying out data processing to identify for each image in the output sequence, from said position data in said look up table, one or more images in the input sequence that contribute to the output image and to calculate from said position data contribution data defining the contribution made to the output image by said one or more identified input images, said processing obtaining the data for said one or more images from the video source and weighting the obtained data in accordance with the contribution data to produce digital data defining the output image.

17. A video processing method as claimed in claim 16, wherein the step of carrying out data processing comprises producing the digital data defining at least one of said output images from two identified input images by combining on a pixel-by-pixel basis the data representing the two input images weighted in accordance with the contribution data.

18. A video processing method as claimed in claim 16, further comprising:
generating control data in response to manipulation by a user of a user-controlled entry device; and
displaying a graphical representation of a relationship between said input sequence and said output sequence, and wherein said processing comprises effecting modifications to the displayed graphical representation in response to said control data and calculating said position data for said look up table corresponding to the relationship as represented by said modified graphical representation.

19. A video processing method as claimed in claim 18, wherein said processing comprises identifying a start image and an end image in said input video images thereby defining an input video clip from which an output video clip is generated.

20. A video processing method as claimed in claim 19 further comprising displaying either of or both said input sequence of video images and said output sequence of video images.

21. A video processing method as claimed in claim 20, wherein each of the images of the input and output image sequences comprises a video frame.

22. A video processing method as claimed in claim 21, wherein said locations in the output sequence of images represented by said addresses are equally spaced.

23. A video processing method as claimed in claim 22, wherein said corresponding locations in the input sequence of images are equally spaced.

24. A video processing method as claimed in claim 23, wherein said displaying comprises displaying substantially orthogonal axes representing input image numbers and output image numbers and displaying a graph plotted against said axes representing said predetermined relationship.

25. A video processing method as claimed in claim 24, wherein said processing comprises using a random access memory device to store said look up table.

26. A video processing method as claimed in claim 16, wherein each of the images of the input and output image sequences comprises a video frame.

27. A video processing method as claimed in claim 16, further comprising the step of displaying either of or both said input sequence of video images and said output sequence of video images.

28. A video processing method as claimed in claim 16, wherein said displaying step comprises displaying substantially orthogonal axes representing input image numbers and output image numbers and displaying a graph plotted against said axes representing said predetermined relationship.

29. A video processing method comprising machine-implemented steps of:
providing input images in a selected input sequence, each input image being represented by an array of pixels in digital form;
generating output images in a selected output sequence, each output image being represented by an array of pixels in digital form and each output image being derived from contributions from at least two respective input images;
said generating comprising a step of establishing a non-linear relationship between the positions of output images in said output sequence and the positions of respective images in the input sequence from which the output images are derived; and
said step of establishing comprising a step of utilizing an interface device by an user to create a curve representing said non-linear relationship.

30. A method as in claim 29 in which said generating step comprises selecting the respective contributions from at least two input images for deriving an output image according to a positional relationship between said input sequence and said output sequence defined by a location on said curve.

31. A method as in claim 30 in which said providing step comprises providing an input sequence which depicts a moving scene and said generating step comprises generating an output sequence which depicts the moving scene at a playing speed which differs from that of the input sequence.

32. A method as in claim 31 in which said providing step comprises providing input images in the form of video frames and said generating step comprises generating output images in the form of video frames.

33. A method as in claim 29 in which said providing step comprises providing input images in the form of video frames and said generating step comprises generating output images in the form of video frames.

* * * * *